United States Patent [19]

Akhmadiev et al.

[11] Patent Number: 4,457,236
[45] Date of Patent: Jul. 3, 1984

[54] PIPE INTERNAL TOWING CARRIAGE

[76] Inventors: Galimzyan M. Akhmadiev, ulitsa Lenina, 75, kv. 1., Almetievsk; Ilya A. Buvailo, ulitsa Gagarina, 105, kv. 35., Kazan; Vasily M. Morgun, ulitsa Dekabristov, 93, kv. 12., Kazan; Felix I. Mutin, ulitsa Komarova, 24, kv. 20., Kazan; Petr I. Yastrebov, ulitsa Korolenko, 23, kv. 29., Kazan; all of U.S.S.R.

[21] Appl. No.: 347,120

[22] Filed: Feb. 9, 1982

[30] Foreign Application Priority Data

Feb. 24, 1981 [SU] U.S.S.R. .............................. 3254159

[51] Int. Cl.³ ............................................ B61B 13/10
[52] U.S. Cl. ................................. 104/138 G; 105/365
[58] Field of Search ............... 104/138 R, 138 G, 166, 104/167; 105/365; 15/104.03, 104.05, 104.3 R; 134/166 C, 167 C, 168 C, 169 C; 33/1 H, 178 F; 73/40, 40.5 R, 40.5 A; 250/358.1; 72/466; 254/134.5; 118/105, 254, 306, 317, 408, 622, 118 DIG. 10

[56] References Cited

U.S. PATENT DOCUMENTS 3,890,905  6/1975  Clavin ........................... 104/138 G
4,055,315  10/1977  Gvelesiani et al. ......... 104/138 R X

FOREIGN PATENT DOCUMENTS 481748  9/1975  U.S.S.R. .

Primary Examiner—Randolph Reese
Attorney, Agent, or Firm—Ladas & Parry

[57] ABSTRACT

A pipe internal towing carriage comprises friction rollers intended for engagement with the internal periphery of the pipe, the friction rollers being mounted successively on a drive shaft such that their axes of rotation are mutually parallel and intersect the axis of rotation of the shaft. The shaft has a stepped configuration, each of the steps carrying one of the rollers, the steps being axially offset relative to each other lengthwise of the shaft.

9 Claims, 11 Drawing Figures

PIPE INTERNAL TOWING CARRIAGE

This invention relates to pipe internal transport means, and more specifically to a pipe internal towing carriage.

The invention is particularly applicable for towing diagnostic, cleaning, coating and other machines internally of pipes of 250+200 mm in diameter and below. It can also find application for field use in the oil and gas industry.

It can further be used as successfully in civil engineering, chemical and food industries.

In view of the ever growing industrial outputs, putting in operation of new industrial enterprises and an ever increasing production of power through a more extensive development of the oil and gas industry, the total length of pipelines and especially construction of small-diameter pipelines has dramatically increased recently in many of the world's countries.

In most cases such pipelines are subject to internal corrosion. Therefore, in order to increase the life and reliability of the pipelines, various rust preventive operations must be carried out involving diagnostics and repairs of pipes. Laying of new pipelines also calls for pipe interior flaw detection and elimination of defects found in anti-corrosive coatings.

Equipment and machines for the above purposes have been developed in many countries.

However, another complementary problem is to provide means for propelling internally of pipes apparatus for diagnosing, cleaning and coating their inner walls.

There is known a self-propelled apparatus for internally coating and diagnosing the weld seam quality of a pipe comprising mounted on support rollers several flexibly interconnected carriages, the axes of rotation of the rollers being perpendicular to the longitudinal axis of the pipe. The carriages mount a drive means, transmission for translating rotational movement to the support rollers, means for adjusting the required length of the carriage travel to a portion of pipe to be processed, and actuating mechanisms (cf. U.S. Pat. No. 3,967,584).

There is also known a powered pipeline crawler for processing interior surfaces of pipes in the form of a carriage provided wtih support wheels, the axes of rotation of the wheels being perpendicular to the longitudinal axis of the pipe being processed. The carriage is propelled by means of an electric motor powered by a battery, both the motor and the battery being secured on the carriage (cf. U.S. Pat. No. 4,034,679).

The above devices serving for travelling inside pipes and their processing involve the use of traditionally accepted roller- or wheel-supported carriages provided with power means, mechanical transmissions to rotate the wheels, means to automate pipe processing and other implements. Inherent in these devices are disadvantages residing in that the use of conventional carriages supported by wheels the axes of rotation of which is perpendicular to the direction of travel of the carriage inside pipes and the employment of mechanical power transmissions make such machines structurally overcomplicated, labor-consuming to manufacture and not sufficiently reliable or efficient in operation.

In addition, the above apparatus feature a relatively low tractive force and can hardly be applied for use in a pipeline layed with a grade of over 10 degrees and pipe diameter of less than 250 mm.

One towing carriage for moving inside pipes is known to comprise spring-loaded friction rollers arranged on a drive shaft at a certain distance from the axis of rotation of the shaft and disposed radially equidistantly therearound. In addition, the friction rollers are spaced a certain distance from one another axially of the shaft. The friction rollers are 12 in number and their purpose is to engage with the internal periphery of the pipe.

The axes of rotation of these friction rollers are set at an acute angle to the axis of rotation of the drive shaft.

The friction rollers come into engagement with the internal periphery of the pipe by rolling helically therealong once the shaft is rotated by a power drive thereby advancing the carriage longitudinally of the pipe.

Adhesion of the friction rollers with the inner surface of the pipe and a required tractive force are ensured by that the rollers are resiliently urged against the internal periphery of the pipe.

The shaft is connected to a power drive by means of a coupling, the power drive being a conventional electric motor (cf. USSR Inventor's Certificate No. 481,748, IPC F161 59/14, published Dec. 25, 1972).

The above known towing carriage is structurally complicated and insufficiently reliable, mostly due to the arrangement of the friction rollers around the drive shaft.

This arrangement requires that the diameter of the friction rollers must be less than half the diameter of the pipe, which calles for higher rotational speed of the rollers relative to drive shaft rotation, which also reduces the reliability and service life of the towing carriage.

Further, for a well-balanced performance of the shaft it is necessary that at least three friction rollers be secured around the shaft radially spaced from one another 120°. Preferably, pluralities of such friction rollers are employed which structurally complicates the carriage and effects its operation in small-diameter pipes (such as 250 mm in dia and below).

Also, such a construction of the towing carriage features a rather low tractive force when used in small-diameter pipes.

It is therefore a principle object of the present invention to provide a pipe internal towing carriage wherein friction rollers would be arranged so as to improve the reliability of the towing carriage.

Another no less important object is to provide a towing carriage wherein the friction rollers would be arranged so as to structurally simplify the towing carriage.

Another object is to provide a towing carriage wherein the friction rollers would be arranged in such a manner as to increase the tractive force of the towing carriage, that is the force required to advance cleaning or other apparatus internally of the pipe transported by the carriage.

These objects are attained by that in a pipe internal towing carriage comprising intended for engagement with the internal periphery of the pipe friction rollers mounted on a shaft connected with a drive means, the friction rollers having their axes of rotation arranged at an angle relative to the axis of rotation of the shaft, according to the invention, the friction rollers are mounted on the shaft successively in a row such that their respective axes of rotation are mutually parallel and intersect the axis of rotation of the shaft, the shaft having steps at the portions thereof where the friction rollers are disposed, each of the steps carrying one of the friction rollers, the steps being offset relative to each other lengthwise of the shaft.

This arrangement provides for the diameter of the friction rollers to be a little less than the diameter of the pipe which in turn allows a relatively slow-speed rolling of the rollers about the internal periphery of the pipe thereby improving the reliability of the towing carriage.

This construction of the towing carriage is quite simple and sufficiently efficient for use internally of small-diameter pipes, such as those of 250 mm in dia or even less.

Preferably, the shaft is composite comprising a stepped sleeve and a rod carrying the sleeve and connected therewith for relative rotation.

The composite arrangement of the shaft made up of the stepped sleeve receiving the rod for relative rotation of these two elements affords independent rotational movements of the stepped sleeve and the rod and enables their self-alignment.

Conveniently, the shaft is dynamically disbalanced, for which purpose it carries counterweights, centers of mass of these counterweights lying in a straight line parallel with the axis of rotation of the shaft.

Such an arrangement of the shaft assures that the friction rollers acted upon by a centrifugal force developed by the counterweights are urged toward the internal periphery of the pipe to roll spirally therealong under the action of forces providing a rolling moment of the friction rollers.

Thanks to the centers of mass of the counterweights lying in a straight line parallel with the axis of rotation of the shaft, the centrifugal forces acting on each of the rollers separately are equal in value and similar in direction, which is important for the reliable operation of the towing carriage.

Preferably, a plane passing through the centers of mass of the counterweights and the axis of rotation of the shaft makes up an acute angle with a vertical plane.

This feature ensures that a rolling moment of the friction rollers relative to points of contact of the friction rollers with the interior surface of the pipe occurs under the action of a centrifugal inertia force of the dynamically disbalanced shaft.

Preferably, the counterweights are positioned on both sides of the row of friction rollers.

This allows, along with equal rolling moment acting on each of the friction roller, to arrange the friction rollers on the shaft in a compact set; also, the manufacture of the stepped shaft is much simplified, whereas the towing carriage can be assembled and disassembled more easily.

Conveniently, at least three friction rollers are provided, the counterweights being interposed equidistantly lengthwise of the shaft between the friction rollers; this enables to obtain equal distribution of the rolling moments between all the friction rollers and conceal the counterweights not to hamper the connection of the towing carriage with pipe processing machines it transports.

Alternatively, the shaft may be provided with a hollow which accommodates the drive means, the counterweights being mounted directly on the shaft of the drive means.

This enables to dispense with a coupling for connecting the drive shaft with the shaft carrying the friction rollers.

The above arrangement also enables to reduce the length of the towing carriage and increase the inertial mass of the towing carriage which is advantageous for obtaining a higher tractive force.

Another modification is possible wherein the counterweights are fashioned as hollows rotating bodies arranged coaxially relative to the axis of the drive shaft, the hollow rotating bodies having electromagnetic windings, the hollows of the rotating bodies being partially filled with a ferromagnetic material.

This assures a low starting torque of the drive due to a small dynamic disbalance of the shaft, the counterweights thereby assuming an additional function of an overrunning clutch, which improves performance characteristics of the towing carriage.

Alternatively, the drive is provided with a hollow rotor having an electromagnetic winding, the hollow of the rotor being partially filled with a ferromagnetic material.

The use of the rotor as a counterweight enables to reduce the length of the carriage and simplify it structurally thereby reducing its weight and the amount of labor consumed for its manufacture.

In view of the foregoing, the towing carriage according to the invention features high reliability and relatively simple structural arrangement.

Another advantage of this towing carriage resides in an increased tractive force thereof, that is the pulling effort developed by the carriage when towing internal pipe processing machines connected thereto.

These and other features of the present invention will become more fully apparent from consideration of a more detailed description that of various embodiments thereof follow taken in conjunction with the accompanying drawings, in which.

Figure 10:
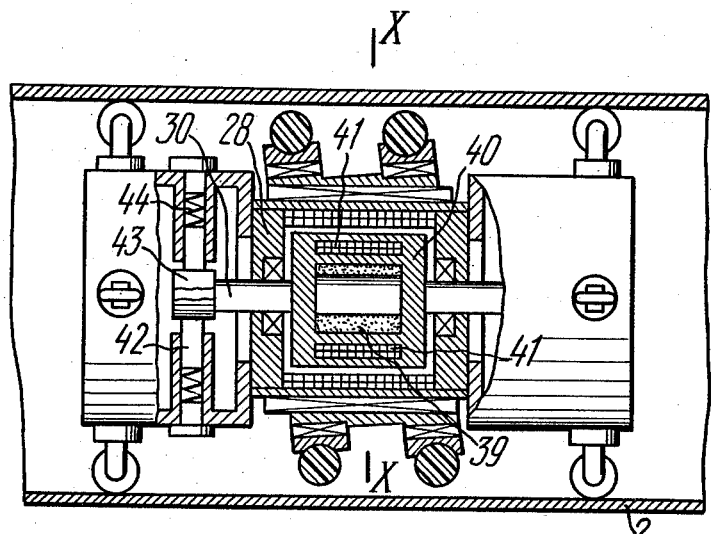
Figure 11:
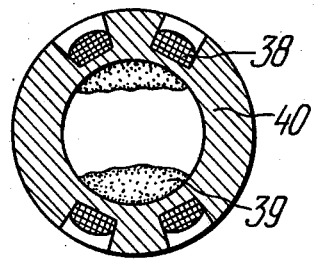

FIG. 10 is a schematic representation of yet another embodiment of the pipe internal towing carriage showing a portion of the pipe, wherein a rotor of the drive means serves as the counterweight, the rotor being provided with electric windings and a hollow cavity partially filled with a ferromagnetic material, a top longitudinal section reduced in scale; and FIG. 11 shows a section taken along the lines X—X of FIG. 10, the pipe not being shown.

Figure 1:
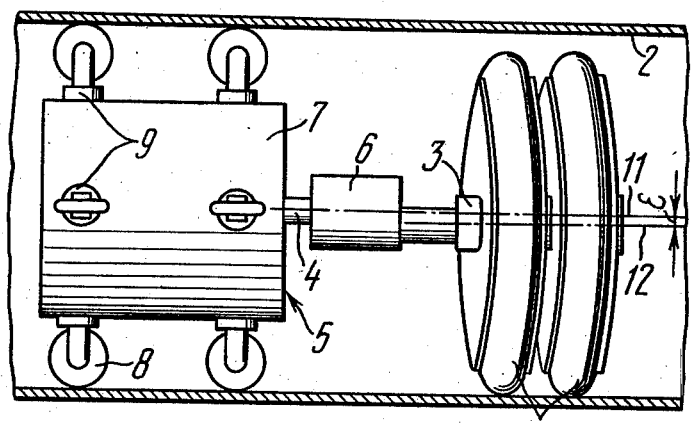
FIG. 1 is a schematic representation of a pipe internal towing carriage embodying the present invention showing a drive and a longitudinal section of a portion of the pipe.

With reference to FIG. 1, there is shown one embodiment of a towing carriage comprising two friction rollers 1 intended for engagement with inner periphery of a pipe 2.

The friction rollers 1 are of equal diameter mounted on a shaft 3 in succession, the shaft 3 being connected to a shaft 4 of a drive means 5 by way of a coupling 6.

The drive means 5 incorporates an electric engine (not shown) of any known suitable design.

The drive means 5 is provided with a housing 7 arranged coaxially relative to the pipe 2 and is maintained in such a position by eight support wheels 8 resiliently urged against the interior wall of the pipe 2 and connected to the housing 7 by means of brackets 9. The wheels 8 are disposed equidistantly radially and axially of the housing 7.

The wheels 8 serve to support the housing 7 during longitudinal advancement thereof along the pipe 2, as well as to dampen the reactive torque arising during engagement of the electric motor of the drive means 5.

Figure 2:
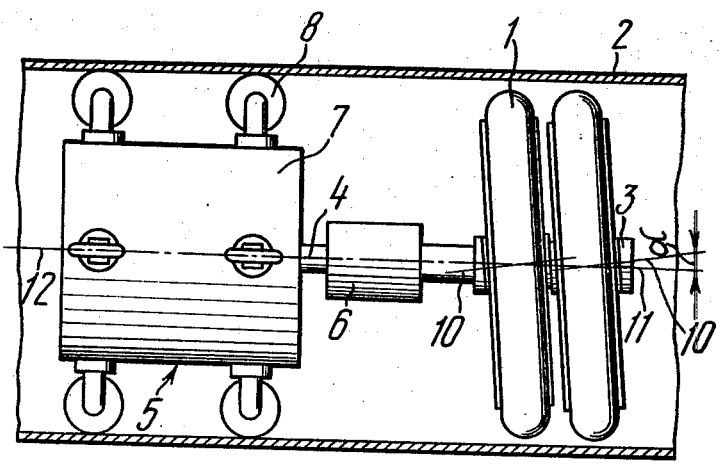
FIG. 2 is a plan view of FIG. 1 showing that axes of rotation of friction rollers intersect the axis of rotation of the shaft.

The friction rollers 1 have their own axes 10 (FIG. 2) of rotation arranged at an angle relative to an axis 11 of rotation of the shaft 3 for these axes 10 to intersect the axis 11 of rotation of the shaft 3 at the acute angle $\alpha$, as seen best in FIG. 2.

The towing carriage is disposed in the pipe 2 with an eccentricity $\epsilon$ (FIG. 1), and more specifically the axis 11 of rotation of the shaft 3 is parallel with an axis 12 of the pipe 2 spaced therefrom a distance equal to the eccentricity $\epsilon$ as seen best in FIG. 1.

A sufficiently small value of this eccentricity $\epsilon$ enables to increase the diameter of the friction rollers 1 to a required maximum; this being desirable for reducing the number of revolutions made by the friction rollers 1 in the course of their engagement with the interior periphery of the pipe 2 and for improving the reliability of the towing carriage.

The shaft 3 is broken or stepped in the portion thereof whereon the friction rollers 1 are disposed, steps 13 (FIG. 3) being of generally cylindrical shape.

The steps 13 are adapted to adjoin each other, each of the steps 13 accommodating one friction roller 1 journaled on ball-bearings 14 of any known suitable design.

Figures 3, 4:
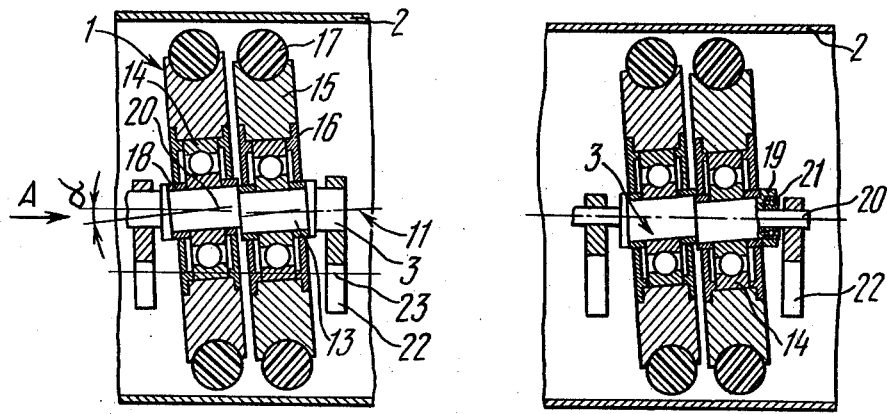
FIG. 3 is a schematic representation of the pipe internal towing carriage embodying the present invention wherein the shaft carries counterweights showing a longitudinal section of a portion of the pipe.
FIG. 4 is a schematic representation of the pipe internal towing carriage embodying the present invention wherein the shaft is composite, made up of a sleeve and a rod and carries counterweights.

As best seen in FIG. 3, each friction rollers 1 has a hub portion 15 journaling the bearings 14 closed on both sides by cover plates 16. The outer surface of each hub 15 facing the interior surface of the pipe 2 has a groove (not indicated by a reference character) of a cross-sectional configuration in the form of an arc of a circle for receiving a ring member 17 fabricated from polyurethane to provide improved adhesion with the inner surface of the pipe 2 in points of contact therewith.

Each friction roller 1 is fixed in position on the corresponding step 13 of the shaft 3 by means of thrust sleeves 18.

With reference to FIG. 4 the shaft comprises of a stepped sleeve 19 and rod 20 which are connected to each other. This arrangement enables the rotation of the shaft 3.

The stepped sleeve 19 is mounted on the rod 20 by means of roller bearings 21 of any known suitable design arranged on both sides of the sleeve 19. The shaft 4 of the drive means 5 is connected with the shaft 3 directly through the rod 20.

The shaft 3 is dynamically disbalanced to provide for a centrifugal force improving the adhesion of the friction rollers 1 with the interior of the pipe 2 in the course of their advancement therealong.

The dynamic disbalance is provided by virtue of the shaft 3 carrying counterweights 22 (FIG. 3), with centers 23 of mass thereof lying along a straight line parallel with the axis 11 of rotation of the shaft 3.

The counterweights 22 are rigidly secured on the shaft 3 and fixed against displacement by set screws (not shown).

In a modification shown in FIG. 4, that is when the shaft 3 is composite, the counterweights 22 are affixed directly on the rod 20.

Figure 5:
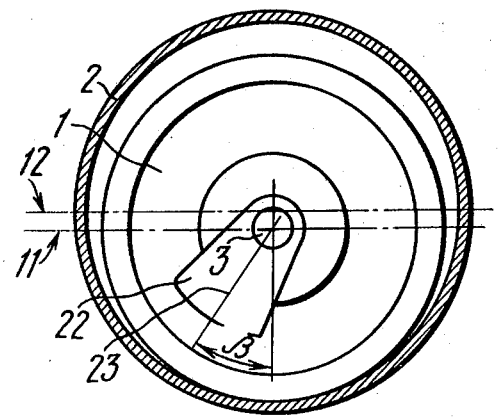
FIG. 5 is a view of the pipe internal towing carriage embodying the present invention taken along the arrow A in FIG. 3.

According to one aspect of the present invention, a plane passing through the centers 23 of mass of the counterweights 22 and the axis 11 or rotation of the shaft 3 makes up an angle $\beta$ (FIG. 5) relative to the vertical.

This angle $\beta$ provides for a rolling moment to occur between the friction rollers 1 and points 24 of their contact with the interior periphery of the pipe 2 by virtue of the shaft 3 being dynamically disbalanced.

As shown in FIGS. 3 and 4, the counterweights 22 are positioned on the two sides of the friction rollers 1 and spaced an equal distance therefrom.

Figure 6:
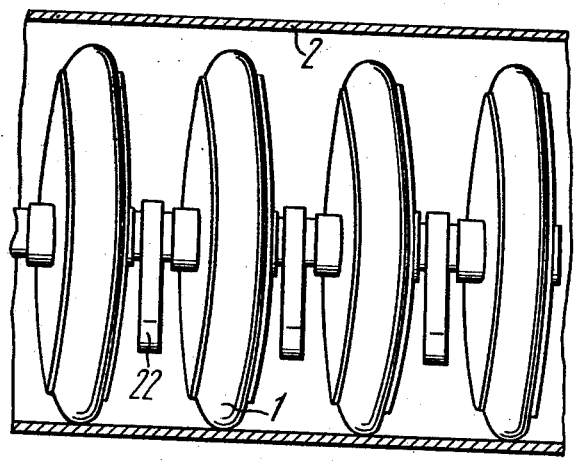
FIG. 6 shows another modification of the pipe internal towing carriage embodying the present invention wherein four friction rollers are provided, the counterweights being interposed equidistantly between the friction rollers along the shaft, the pipe being shown in a longitudinal section.

Referring now to FIG. 6, there is shown another alternative modification of the towing carriage wherein it is provided with three or more friction rollers 1, the rollers being arranged equidistantly along the length of the shaft 3 with counterweights 22 interposed between the friction rollers 1.

Figure 7:
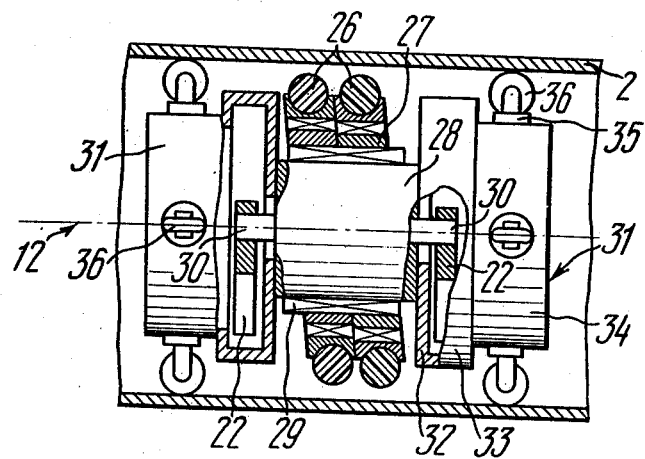
FIG. 7 is a plan view of the pipe internal towing carriage embodying the present invention showing a drive and a portion of the pipe, the shaft having a cavity accomodating the drive, the counterweights being directly secured to the shaft drive, a partial longitudinal section reduced in scale.

In another modification shown in FIG. 7 friction rollers 26 are secured on a hollow shaft 27.

The hollow of the shaft 27 accommodates a drive means 28 journaled in roller bearings 29, the counterweights 22 being secured directly on a shaft 30 of the drive means 28.

Adapted to adjoin the drive means 28 on both sides thereof are coaxially arranged drum elements 31 intended to alleviate a reactive moment from the housing of the drive 28.

A housing 32 of each of the drum elements 31 is of a stepped configuration having a hollow cavity in a portion 33 thereof having larger diameter, this cavity accommodating the counterweight 22.

These cavities are so dimensioned that they easily accommodate the counterweights 22. A portion 34 of smaller diameter have support wheels 36 secured resiliently on brackets 35.

Each of the drum elements 31 is provided with four wheels 36 having their axes of rotation in a perpendicular relation to the longitudinal axis 12 of the pipe 2, which axis 12 coincides with the axis of rotation of the shaft 27 as best seen in plan view shown in FIG. 7.

Figure 8:
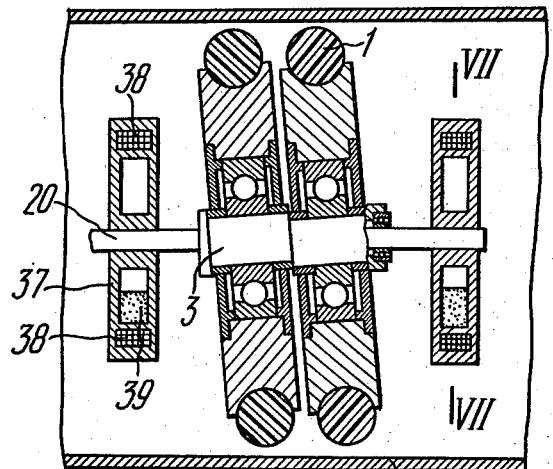
FIG. 8 is a longitudinal sectional view of the pipe internal towing carriage embodying the present invention showing a portion of the pipe, the counterweights being fashioned as hollow rotating bodies provided with electric windings, the hollows being partially filled with a ferromagnetic material.
Figure 9:
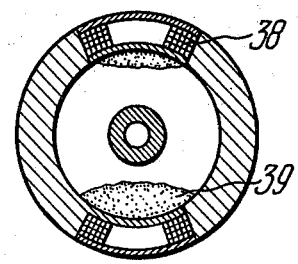
FIG. 9 shows a cross section taken along the line VII—VII of FIG. 8, the pipe not being shown.

With reference to FIGS. 8 and 9, there is shown yet another alternative embodiment of the invention wherein counterweight means 37 are fashioned as hollow rotating bodies, particularly as rings of essentially rectangular cross-section. These hollow rotating bodies are arranged coaxially with the axis of rotation of the shaft 3, the drive means (not shown) being positioned away from the friction rollers 1.

The counterweight means 37 have electromagnetic windings 38 disposed at diametrically opposite locations.

The hollows of the counterweight means 37 are partially filled with a ferromagnetic material 39. The windings 38 serve to provide an electromagnetic field inside the hollow of each of the counterweight 37, this field acting on the ferromagnetic material 39 to thereby concentrate it in opposite parts of the hollow in the amounts directly proportional to the intensity of the electromagnetic field.

Therefore, the ferromagnetic material 39 tending to adhere in unequal amounts to opposite portions of the hollow imparts a dynamic disbalance to the shaft 3, the value of such a disbalance being controlled by changing the intensity of the electromagnetic fields produced by the windings, thereby concentrating different masses of the ferromagnetic material 39 in the diametrically opposite portions of each counterweight means 37.

This modification of the towing carriage enables the present invention to gradually regulate the amount of dynamic disbalance of the shaft 3 and consequently the rolling moment of the friction rollers 1 from zero to a maximum possible value when drive means is engaged with the shaft 3.

As a result, the counterweights 37 have assumed a new function, viz. that of an overruning clutch. The electric current feeding the windings 38 is conducted through a drive shaft (not shown) from the side of the housing of the drive means 5.

In still another alternative modification of the towing carriage according to the invention as shown in FIGS. 10 and 11, the function of a counterweight or disbalance is performed by a rotor 40 of the drive means 28, for which purpose the rotor 40 is fashioned as a hollow rotating body the axis of symmetry of which coincides with a longitudinal axis of the rotor 40. Secured on the rotor 40 are electric windings 41, the rotor 40 having a cavity filled with a ferromagnetic material 39. Electric current is conducted toward the windings 41 through the shaft 30 of the drive 28 by means of sliding contacts 42 urged against commutator bars 43 by springs 33.

The pipe internal towing carriage with reference to FIGS. 1 and 2 operates in the following manner.

With the drive 5 engaged the shaft 4 starts rotating to transmit rotation via the coupling 6 to the shaft 3 carrying the friction rollers 1. The friction rollers 1 are acted upon by a force which urges the friction rollers toward the inner surface of the pipe 2 whereby a moment occurs in points of contact of the friction rollers 1 with the pipe 2 causing the rollers 1 to roll on the interior periphery of the pipe 2.

Because of the acute angle $\alpha$ between the axis 10 of rotation of the friction rollers 1 and the axis 11 of rotation of the shaft 3, the friction rollers 1 turning in the bearings 14 on the shaft 3 tend to advance spirally on the inner surface of the pipe 2.

Rotation is transmitted to the shaft 3 from the shaft 4 of the drive 5 by means of the coupling 6.

The towing carriage with reference to FIG. 3 is caused to move internally of the pipe 2 thanks to a centrifugal force occuring due to the dynamically disbalanced shaft 3 when a rotational movement is translated thereto from the shaft 4 of the drive means 5.

This dynamic disbalance is assured by the provision of counterweights 22 secured on the shaft 3.

The provision of counterweights 22 on the shaft 3 results in that rotation translated thereto caused a centrifugal force of inertia to occur, which force is resolved into a force urging the friction rollers 1 toward the inner surface of the pipe 2 and a force making the rollers 1 roll on the inner surface of the pipe 2.

To provide for a rolling moment at the initial period of operation, the shaft 3 carrying the counterweights 22 is turned at an angle $\beta$ formed between the plane passing through the axis 11 of rotation of the shaft 3 and the center 23 of mass of the counterweights 22 and the vertical plane.

The angle $\beta$ changes its value in direct proportion to the axial load exerted on the towing carriage by various devices it transports, such as machines for internally cleaning the pipe 2.

The towing carriage with reference to FIG. 6 operates generally in a similar manner because the function in the rotating counterweights 22 is essentially the same as in the case of the previous modification.

The modification described with reference to FIG. 7 also operates similar to what has been described heretofore.

The modification of the towing carriage illustrated in FIG. 8 operates as follows:

When the drive 5 is engaged, the shaft 4 rotates thereby transmitting rotation to the rod 20 carrying the friction rollers 1 and counterweight means 37 in the form of hollow rotating bodies.

The ferromagnetic material 39 occupying the hollows of the rotating counterweights 40 is distributed uniformly throughout the inner periphery thereof making the shaft 20 dynamically balanced. Therewith, no unbalanced moment occurs, while the towing carriage stays at rest in spite of the engaged drive 5.

For initiating the advancement of the towing carriage longitudinally of the pipe 2 an electric current is fed to the windings 38 from a source of electric current (not shown).

Magnetic fields of preselected intensity induced by the windings 38 tend to concentrate different masses of the ferromagnetic material 39 on the diametrically opposite areas of the counterweight means 37 making the shaft 3 dynamically disbalanced and thereby almost instantaneously actuating the friction rollers 26.

Such a construction of the counterweight means 37 imparts an added function thereto, particularly that of an overrunning clutch which improves performance capabilities of the towing carriage according to the invention.

Operation of the towing carriage with reference to FIG. 10 is basically similar to that described with reference to FIG. 8.

A prototype pipe internal towing carriage manufactured according to various aspects of the present invention has been comprehensively tested. The test results have shown that the towing carriage, in this case particularly adapted for use with pipes of 100 mm in inside diameter, develops a tractive force of 20 kg at a drive power of 50 W.

Having in view the foregoing, the present invention makes it possible to provide towing carriages which are small in size, light in weight and high in tractive force. Such carriages may be particularly applied for use with pipes of small diameter. They can transport various pipe processing machines for internal cleaning, coating, diagnostics, etc.

The towing carriage according to the invention features relative simplicity along with high efficiency.

The use of the centrifugal inertia forces of dynamically disbalanced shaft as a propelling means made it possible at relatively low-power drive means and small dimensions of the towing carriage to produce considerable axial pulling force depending on the amount of force applied to the friction rollers to press them against the inner surface of the pipe being processed.

In addition, the diameter of the friction rollers is by far in excess of half the value of the pipe diameter, which further simplifies the towing carriage structurally, makes it more reliable in operation and enables to make use of such carriages in pipes of below 250 mm in diameter.

What is claimed is:

1. A pipe internal towing carriage comprising: a drive means; a shaft connected with said drive means; friction rollers mounted on said shaft and intended to engage with the interior surface of said pipe; said friction rollers being mounted on said shaft successively in a row such that their respective axes of rotation are mutually parallel and intersect the axis of rotation of said shaft; said shaft being provided in the area thereof where said friction rollers are secured with stepped portions, each stepped portion carrying one of said friction rollers and being axially offset relative to each other lengthwise of said shaft.

2. A towing carriage as set forth in claim 1 wherein said shaft is composite comprising a stepped sleeve and a rod carrying said stepped sleeve and connected therewith for relative rotation.

3. A towing carriage as set forth in claim 1, wherein, the shaft is dynamically disbalanced by at least two counterweights, said counterweights are attached to said shaft and have centers of mass lying in a straight line which is parallel to the axis of rotation of the shaft.

4. A towing carriage as set forth in claim 3 wherein a plane passing through the centers of mass of said counterweights and the axis of rotation of said shaft makes up an acute angle with a vertical plane.

5. A towing carriage as set forth in claim 3 wherein said counterweights are positioned on both sides of a row of said friction rollers.

6. A towing carriage as set forth in claim 3 wherein there are provided at least three friction rollers, said counterweights being interposed between said friction rollers equidistantly lengthwise of said shaft.

7. A towing carriage as claimed in claim 3, wherein the counterweights are made in a form of hollow rotating bodies having a plurality of electromagnetic windings inside thereof, said windings being positioned diametrically opposite to each other and a hollow portion of said hollow rotating bodies being partially filled with a ferromagnetic material.

8. A towing carriage adapted for movement inside of a pipe, comprising: drive means; a shaft connected to said drive means; a plurality of friction rollers mounted on said shaft and intended to engage with the interior surface of said pipe; said friction rollers being mounted on said shaft successively in a row in a such manner that axes of rotation of said rollers are parallel to each other and intersect the axis of rotation of said shaft; said shaft having stepped portions and being provided in an area of location of said friction rollers, each stepped portion carrying one of said friction rollers and being axially offset relative to each other in one direction lengthwise of said shaft; said shaft being dynamically disbalanced by at least one counterweight, said counterweight being directly mounted on said shaft of said drive means, said counterweight having centers of mass lying in a straight line which is parallel to the axis of rotation of said shaft; and said shaft being provided with a hollow which is adapted to accommodate said drive means.

9. A towing carriage as claimed in claim 8, wherein an electromagnetic winding being inserted inside of the shaft and the hollow being partially filled with a powdered ferromagnetic material, whereby said electromagnetic winding and said ferromagnetic material serve as said at least one counterweight.

* * * * *